United States Patent [19]

Zonsveld

[11] 4,437,495
[45] Mar. 20, 1984

[54] PIPES AND PIPE COATINGS

[75] Inventor: Johannes J. Zonsveld, Woking, England

[73] Assignee: University of Surrey, Guildford, England

[21] Appl. No.: 302,373

[22] Filed: Sep. 15, 1981

[30] Foreign Application Priority Data

Sep. 20, 1980 [GB] United Kingdom ............... 8030460

[51] Int. Cl.³ ............................................. F16L 9/16
[52] U.S. Cl. ................................. 138/144; 138/146;
   138/150; 156/187; 405/158
[58] Field of Search .............. 138/103, 110, 129, 141,
   138/144, 145, 153, 154, 150, 175; 405/158, 171;
   156/187

[56] References Cited

U.S. PATENT DOCUMENTS

| 1,961,974 | 6/1934 | Kraner | 138/144 X |
| 2,696,353 | 12/1954 | Vessels | 138/145 X |
| 3,599,435 | 8/1971 | Kolb | 138/141 X |
| 4,297,409 | 10/1981 | Hannaht | 428/247 |
| 4,393,901 | 7/1983 | Beck | 405/171 X |
| 4,395,159 | 7/1983 | Karuks et al. | 138/110 X |

FOREIGN PATENT DOCUMENTS

| 2728351 | 1/1978 | Fed. Rep. of Germany . | |
| 1582945 | 1/1981 | United Kingdom | 138/175 |

*Primary Examiner*—Stephen Marcus
*Assistant Examiner*—Mark Thronson
*Attorney, Agent, or Firm*—Leydig, Voit, Osann, Mayer & Holt, Ltd.

[57] ABSTRACT

A weight-coated pipe has an innermost anti-corrosion layer, a helically-wound covering of a cementitious sheeting having a reinforcement of organic fibrillated film network arranged as a plurality of superposed layers. This covering is applied in a post-cracked condition so that constituent parts of the next layer of concrete penetrate the micro-cracks and form a good bond. An outer layer of helically-wound sheeting similar to the first-mentioned covering serves to protect the weight-coating of concrete from impact damage.

5 Claims, 7 Drawing Figures

12—CEMENTITIOUS MATERIAL INCORPORATING MULTIPLE SUPERPOSED LAYERS OF ORGANIC FILM

U.S. Patent  Mar. 20, 1984  Sheet 2 of 2  4,437,495
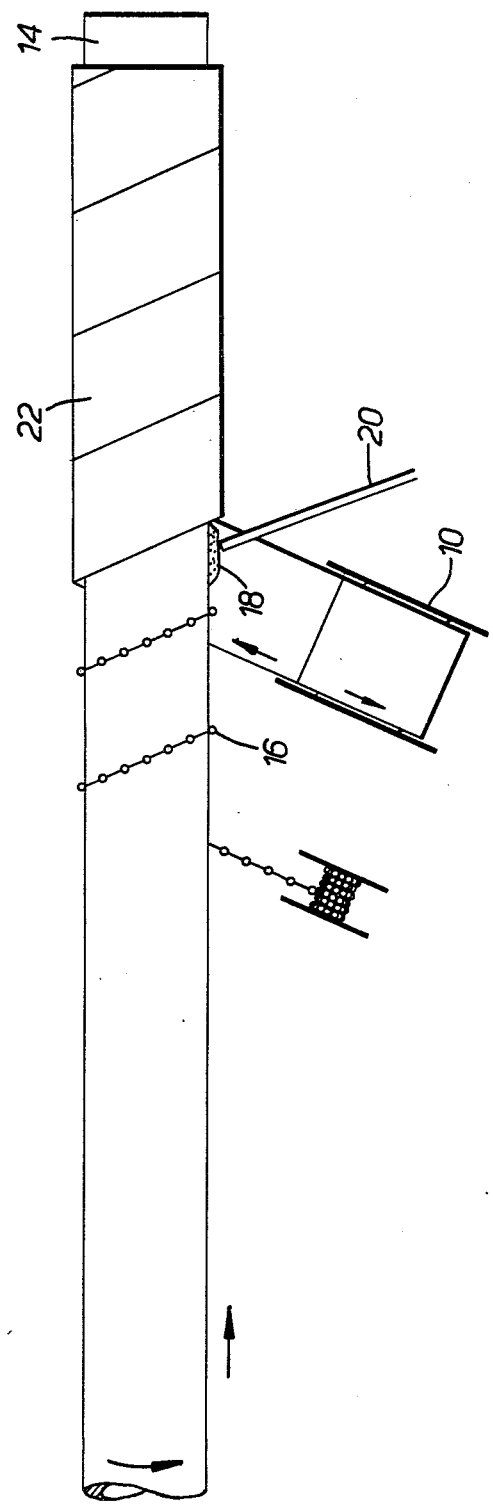

PIPES AND PIPE COATINGS

This invention relates to pipes.

It has already been proposed in British Patent Specification No. 1,582,945 to produce sheeting material having a matrix of water-hardened mass (or material) with a reinforcement in the form of a plurality of layers of fibrillated polypropylene film or other organic material network which has the property of fibrillating, such as high modulus polyethylene. More particularly, this prior British patent and the cognate U.S. Pat. No. 4,297,409 disclose an article comprising a water-hardened substance and network means of fibrillated organic film in the form of a plurality of expanded, non-woven layers embedded within said substance, the fibrils of said film providing continuous mechanical bonding to reinforce the water-hardened substance so that under excess loading the article exhibits multiple cracks. Furthermore, these patents disclose an article comprising a water-hardened substance and network means of fibrillated organic film in the form of a plurality of layers embedded in the water-hardened substance, the effective volume of film in one direction of tensile stress, when loaded, amounting to more than 1½% of the overall volume of the article and the fibrils of said film providing continuous mechanical bonding to reinforce the water-hardened substance in said direction of tensile stress so that under excess loading the article exhibits multiple cracks. As mentioned above the preferred reinforcement is polypropylene film and a particularly economically advantageous form is laterally expanded film arranged as a plurality of layers. In a less preferred form the network means is in the form of a weave with a doubled warp and a single weft so arranged that at each intersection the weft passes over one warp and beneath the other warp; then the warps are twisted after insertion of the weft whereby to lock the weft in position. Materials in accordance with this earlier dated Patent Specification will be marketed under the Trade Marks NETCEM and KALDIN.

Although the method and material of prior Specification 1,582,945 is primarily intended to make use of cement as the matrix, it is also possible to use other water-hardened materials such as gypsum. The present invention will, in general, make use of cement mortar as the matrix and for convenience the term "cementitious sheeting" or "cementitious sheet" as used herein is intended to mean a sheet or sheeting made of a water-hardened material with a reinforcement in the form of a plurality of layers of organic fibrillated film network, such as polypropylene. The sheet or sheeting will be in its post-cracked condition when incorporated in pipes in accordance with the invention. The prior Specification describes in some detail the capability of material in accordance with that prior invention of cracking in the overload condition in such a way as to form a multiplicity of fine cracks and the present invention makes use of this property. The terms "cementitious sheeting" and "cementitious sheet" as used herein are therefore intended to refer to sheeting in the post-cracked condition.

The oil and gas industry now work on a world-wide scale making use of submerged pipelines and particularly in the case of gas pipelines it is necessary to impart a negative buoyancy because motion of the pipeline produced by currents can cause serious damage, as any upwards floating of the pipeline can lead to eventual rupture with obvious disastrous results. At present the concrete weight-coating of such pipelines is securely held in place by a steel mesh reinforcement. Impact damage causing superficial concrete cracking can result in progressive corrosion of the steel mesh. Spalling and subsequent breaking up of the concrete has, in the past, resulted from corrosion of the mesh. The various aspects of the present invention enable the omission of the steel mesh.

Submerged pipelines are generally made of high quality steel but it is important that this steel shall be completely and permanently protected against the very corrosive action of sea water.

Considerable sums are currently expended with a view to achieving this aim, but to some extent such an aim is inconsistent with the application by the conventional impingement method of a weight-coating of concrete, since the actual application stage of the fresh concrete can lead to puncture of the anti-corrosion layer previously applied to the pipes. Even a pin-hole can lead eventually to extensive and disruptive corrosion.

According to the present invention in a first aspect there is provided a method of producing a combination of a metallic pipe and a cementitious covering for the pipe comprising the steps of winding cementitious sheeting (as hereinbefore defined) around the pipe with the sheeting in its post-cracked condition and securing the wound sheeting in position in relation to the pipe.

Further according to the invention in the same aspect there is provided a pipe incorporating at least one helically-wound cementitious sheet (as hereinbefore defined) the cementitious sheet being in a post-cracked condition with a multiplicity of micro cracks in at least one surface thereof.

Contrary to the generally accepted understanding of persons skilled in the art of cement-based products, the material referred to as "cementitious sheet" or "cementitious sheeting" has sufficient flexibility or ductility both in its green (unhardened) and hardened states to be wound around a core into a coil for storage and transportation to its place of use. When coiled in its green state, a thin sheet, for example polyethylene foil, is interposed between the turns to separate the layers as the material will usually harden during storage.

When the material is wound in its hardened state to form the coil, multiple cracking or crazing will occur at the outer surface of the material, as wound. Conversely, when the material is unwound on the coil, if it was initially wound in the green state, a multiple fine cracking or crazing will occur at the surface which was the inner surface when wound on the core. Owing to the nature of the reinforcement this multiple fine cracking does not even disturb the integrity of the material in contrast to other cement-based materials.

In the preparation of pipes for submersion great care has been taken to ensure that the pipes are fully protected and one method which has already been adopted is the application of a layer of the order of 200 to 500 microns thickness of a suitable epoxy-resin. The method involves heating the pipe to 180° to 200° C. and spraying epoxy-resin powder on to the pipes where it fuses to form a tough, corrosion-resistant, coating. While the presence of concrete in contact with this corrosion protected surface does not impair its effectiveness, there is some risk during manufacture that when using high-speed "throwing" techniques impingement of sharp aggregate particles in the concrete mix is liable to damage the anti-corrosion protective coating.

In accordance with the method and apparatus of the first aspect of the invention the cementitious sheeting is wound on to the anti-corrosion material and preferably the sheeting is secured with the aid of a compatible adhesive directly to the coating.

Since the anti-corrosion coating of the pipe may be smooth, it will generally be desirable during manufacture to apply the epoxy adhesive either to the pipe or to the inner face of the inner layer of hardened sheeting so that there is proper adhesion between them.

The impinging concrete can be applied without risk of damage to the corrosion protection coating since the cementitious sheeting is well capable of withstanding the impact of concrete particles during its application stage.

Small-diameter pipelines, displaying no buoyancy when empty, need no weight-coating but may require mechanical protection of the rather vulnerable epoxy coating. A layer of helically-wound cementitious sheeting applied round the anti-corrosion coating ensures protection against impact and abrasion. Such pipes are sometimes laid from a reel ship where the deformation of the pipe is such that the yield point of steel is exceeded. In order to accommodate the compressive strains in the cementitious sheeting, it will be desirable to wind with a small gap between the turns and to select an epoxy formulation of adequate elasticity, e.g. one with a polyamide curing agent. On bending, the cementitious sheeting then retains its integrity on the compressed side of the pipe.

In accordance with a further development of the invention, the concrete is applied while a layer of cementitious sheeting is wound at a spacing from the pipe surface and this layer forms a permanent shutter. The helically-wound layer will be in the post-cracked condition. To ensure concentricity a helical spacer member or members may be provided between the helically-wound layer and the pipe.

It is possible to make use of the post-cracked condition of the sheeting to improve keying to the concrete so that the more liquid portions of the concrete mix will tend to flow into the cracks during the manufacturing stage.

If no layer of cementitious sheeting is applied, the problem of adhesion between the concrete weight-coating and the anti-corrosion coating remains the same, as it is not possible to increase adhesion simply by applying an adhesive to the outer surface of the anti-corrosion coating. There is a particular risk that even if initial adhesion is tolerably good, the weight-coating concrete can slide relative to the pipeline itself when clamps are gripping the concrete as it is being dispensed from a laying barge, because the considerable weight of hanging pipe beneath the water surface will set up high shear stresses.

As an alternative, therefore, the helically-wound inner sheeting can be applied in the manner of a screw, so that in axial cross-section the pipe has a castellated form and the keying provided by the internal layer adhered to the anti-corrosion coating by an epoxy-adhesive will render slipping of the weight-coating concrete relative to the pipe itself more unlikely.

In accordance with either aspect hereinbefore described, the cementitious sheeting may be wound around a pipe in its "green" unhardened condition or wound to form the inner or outer skin of the pipe in the green condition.

Summarizing, the aspect of the invention first considered namely weight-coating of the pipelines provides for the following possibilities:

(a) protection of an anti-corrosion coating on a steel pipe by a single layer of cementitious material applied directly to the anti-corrosion coating;

(b) a complete weight-coated pipe incorporating a layer of cementitious sheeting which serves both as a permanent shutter and as a protection against handling during installation and abrasion/impact when installed in submerged conditions;

(c) the provision of a partial protection for an anti-corrosion protected pipeline by means of a helically-wound layer of cementitious sheeting with the turns spaced from one another so that externally applied concrete will be effectively keyed to the pipe.

According to the present invention in another aspect there is provided a method of producing a pipe comprising helically winding cementitious sheeting (as hereinbefore defined) on to a mandrel, applying spacing means to the outer surface of the cementitious sheet on the mandrel, winding a second cementitious sheeting on to the spacers and simultaneously filling the space between the two layers of sheeting with a concrete or mortar mix.

Concrete pipes are well known but at present have the disadvantage that costly moulds have to be provided and these have a relatively short life owing to the highly abrasive nature of concrete. This second aspect of the present invention provides a method which enables such pipes to be formed with the aid only of a simple mandrel which will be in contact with relatively less abrasive cementitious sheeting (as hereinbefore defined) and the outer layer of cementitious sheeting acts as a permanent shutter thus avoiding the necessity of any mould.

As for the first aspect of the invention, the cementitious sheeting will be stored on coils and either the inner or the outer surface will be in a post-cracked condition depending on whether the material is initially hardened or is in a green condition.

Although the method in accordance with the second aspect of the invention will normally make use of concrete, mortar can also be used for particular purposes. Again as for the first aspect of the invention the post-cracked condition of the layers will be used for keying purposes and provided adequate vibration is ensured the finished pipe can be used for the conveyance of gas or liquid since the cracks in the cementitious sheeting will be effectively filled thus rendering the pipe fully impervious.

The invention will now be described, by way of example only, with reference to the accompanying diagrammatic drawings, in which:

FIG. 3 illustrates the method of manufacturing the pipe illustrated in FIG. 2; and FIGS. 4A to 4D are side elevations illustrating the test specimens.

Figure 1:
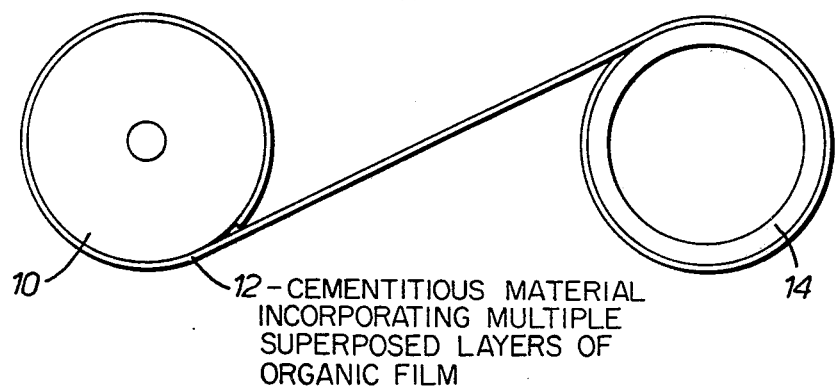
FIG. 1 illustrates the unwinding of cementitious sheeting from a coil or reel and applying the sheeting on to a pipe.

Referring now to FIG. 1, a coil 10 of cementitious sheeting 12 (as hereinbefore defined) has been wound on to a reel or drum of appropriate diameter and if initially in a hardened condition the sheeting will crack to form multiple fine cracks on the surface, which when wound on the reel will be outside. If the cementitious material is initially "green", that is unhardened, then cracks will not normally be formed during the winding-on process but will arise during unwinding and will then occur on the inner face (as wound) of the sheeting. The sheeting will, as indicated in FIG. 1 be helically-wound on to a pipe 14 and winding will continue for the full length of that pipe. Although not shown, the pipe will have an anti-corrosion layer of epoxy-resin on its outer surface and prior to the winding of the sheeting on to the pipe, epoxy adhesive will have been applied to the anti-corrosion epoxy coating. As illustrated, the post-cracked surface when coiled in the green state will lie outermost on the pipes so that good keying is ensured with the concrete mix to be applied subsequently.

In the method illustrated in FIG. 3 a pipe is used which may or may not have been provided with a layer of cementitious sheeting to protect the anti-corrosive coating and additionally a helical spacer 16 has been wound on to the outside of the pipe. The single continuous spacer could be replaced by a plurality of individual spacers such as spheres arranged like beads on a string. It is then possible to wind a second or additional layer 22 of cementitious sheeting and substantially simultaneously an appropriate concrete or mortar mix 18 fills the space between the two layers of sheeting delivered through a nozzle 20. Compaction to achieve a high density of the concrete can be effected in the conventional way by vibration, for example by a poker vibrator or by vibrating the pipes at the point of filling. Conveniently, the pipe will be rotated and translated, the reel of cementitious sheeting and the concrete injection nozzle remaining stationary. In this instance it would be preferable that the outermost surface of the outer sheeting will be in a non-cracked condition and that the inwardly directed surface will be cracked so that good keying is ensured with the concrete filler.

Figure 2:
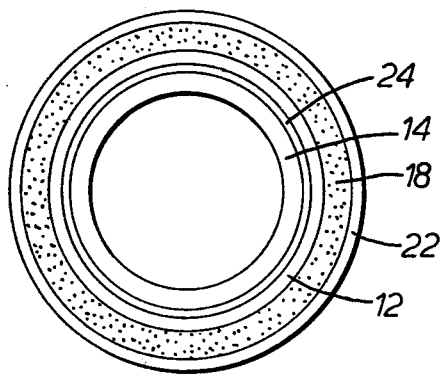
FIG. 2 is an end elevation of a pipe produced in accordance with the first aspect of the invention.

The completed pipe is illustrated in FIG. 2 where all the layers are individually shown including the anti-corrosion protection 24 on the immediately outer surface of the pipe which is shown with a greatly exaggerated thickness.

In a practical example such a pipe having a diameter of 1 m. and 13 m. length would make use of inner and outer cementitious sheeting layers 12 and 22. The sheet would be about 3 mm. thickness (it could be as small as 2 mm. and as large as 6 mm.) and the width is 1.2 m. (it could be as little as 0.3 m.).

The weight-coating of the pipe can be modified by incorporating short chopped lengths of fibrillated polypropylene twine in the concrete to improve its impact resistance. Alternatively, a reinforcing network of fibrillated polypropylene can be incorporated in the concrete or mortar mix in order further to improve impact resistance.

Instead of winding the inner and/or outer layer of cementitious sheeting from a single coiled sheet, two or more narrower sheets can be applied as a multi-start helical winding.

Although epoxy-resin has been referred to as the preferred anti-corrosion coating, other coating materials such as bitumen or epoxy bitumen can be used.

In its broadest aspect the invention can be considered as extending to a pipe, not necessarily of circular cross-section, which incorporates cementitious sheeting (as hereinbefore defined) in a post-cracked condition.

EXAMPLE 1

A test specimen (A) was made consisting of a slab of concrete on a substrate in the form of rigid steel plate 3 mm. in thickness with a sheeting of a cement mortar mix having a plurality of layers fibrillated polypropylene network incorporated therein. The specimen was made in a mould measuring 0.5×0.5 M/ and 50 mm. thickness. The concrete mix used for this slab had the following composition in parts by weight:

Cement 1;
Free water 0.51;
Sand (5 mm. downwards) 2;
Thames gravel of 5–10 mm. 1;
Thames gravel of 10–20 mm. 2;

After hardening, this concrete had a compressive strength of 45 $MN/m^2$., which is in the range of strengths required for submerged pipelines. The sheet was one of the composites referred to in British Patent Specification No. 1,582,945. The sheet was placed in the mould while the concrete was being vibrated to ensure proper compaction. The sandwich of steel, hardened concrete and cementitious sheet represents the system of weight-coating where the sheeting serves as a permanent shuttering. The specimen was tested under conditions simulating those met by weight-coated pipes in practice when handled, being laid or in a vulnerable position on the sea bed.

A specimen (B) was made in a similar way to test specimen (A), but the concrete mix included a reinforcement of chopped, short lengths of fibrillated polypropylene twine. Such concrete is known in itself and is known under the trade name "CARICRETE". It has a high impact resistance and can be used in conditions where such resistance is necessary as in pile driving. In the particular control specimen, commercial twine of twisted fibrillated polypropylene cut into 35 mm. staple was used. 0.5% by volume was added to the concrete. This specimen incorporated cementitious sheeting as specimen (A).

A control specimen (C) was prepared in the form of a slab of concrete of the same dimensions as specimen (A).

A further control specimen (D) was prepared in the form of a slab of concrete of the same dimensions as specimen (A) but with reinforcement as in specimen (B). No cementitious sheeting was included.

Impact tests were carried out by dropping a steel ball of 80 mm. diameter and of 2 kg. weight from heights up to 4 m. on to the test slab. The damage to the control slabs (C) and (D) resulting from repeated drops on one spot was observed and the load (20N) was multiplied by height in meters and number of drops to obtain the energy in Joules needed for this damage to occur. Hair cracks in the concrete layer which were visible under a magnifying glass developed in both controls at 80J, while severe cracks, that is branched cracks, were clearly visible to the naked eye at 160J in plain concrete. Control specimen (D) showed no severe cracking even after 8000J was expended in ten drops from 4 m. height.

The falling ball experiments on specimen B, covered with cementitious sheeting exhibited indentation and slight abrasion of the sheeting surface with cracking of the concrete underneath. These cracks when inspected, after removal of the steel substrate, were similar to those in the corresponding control slabs but the cracked concrete was in all cases restrained and protected by the cementitious sheeting.

EXAMPLE 2

A steel pipe without any concrete weight-coating, but having an exposed, corrosion-protected coating was helically-wound with sheeting in accordance with the invention (see FIG. 1 and related description) for mechanical protection of the coating. The pipe had been factory-coated at about 180° C. with an epoxy powder compound which had cured to give a hard, smooth finish on the pipe. The outer diameter of the pipe was 170 mm. It was wrapped with cementitious sheeting of 250 mm. width, and, during the winding of two-component fluid epoxy adhesive, at a rate of covering 400 g/m² was applied to the inside of the sheeting. Steel wire strapping temporarily secured the sheeting at the beginning during the hardening of the adhesive at ambient temperature. The pipe which had been protected for half of its length with a helically-wound sheeting was tested in the following ways:

Falling steel balls were used to test impact strength, each ball weighed 2 kg. and had a diameter of 80 mm. Another ball used weighed 0.225 kg. and had a diameter of 38 mm. The smaller ball falling from a height of 2 mm. on to the unprotected epoxy coating caused a slight dent but falling from 3 m. it chipped the coating to show some bare steel where corrosion of the steel pipe could set in. The same ball falling from 3 m. on to the wrapping caused no damage even after repeated drops on the same spot.

The larger ball chipped the epoxy coating after one fall from a 2 mm. height. Falls on the sheeting proved harmless from a height of 2 m. and from a height of 3 m. when impacting upon the sheeting. Slight abrasion and formation of powder on the surface of the sheeting was the only effect after repeated drops on the same spot from 3 m. height.

The adhesion of the wrapped sheeting was tested by glancing hammer blows and the sheeting itself was locally destroyed and then an attempt was made to peel the sheeting from the coated surface. No loss of adhesion was observed.

In practice, such small diameter pipes, as tested, are twice deformed beyond the yield point of the steel, first when being reeled and later when unrolled from the reel. The ability of the cementitious sheeting to follow such deformations was tested in the manner described hereinafter in Example 3.

EXAMPLE 3

Cementitious sheets having a width of 0.25 m. and a length of 0.5 m. were adhered on to each side of a 0.5×0.5 m. steel plate 3 mm. thick. One sheet extended across the plate parallel to the two sides, while the other sheet was adhered diagonally. A two component fluid epoxy adhesive as used in Example 2 was spread at a coverage of about 300 g/m² on the sheeting, which, after curing at ambient temperature, bonded it firmly to the steel.

In a four-point bending test, the plate produced in the immediately preceding paragraph was bent to a radius of curvature of 0.5 m. This condition simulated the bending of the pipe described in Example 2 with an outer diameter of 170 mm. around a hub of 18 m. diameter corresponding to the reel.

Another test represented the bending of a 400 mm. outer diameter pipe around the same hub. Then the radius of curvature of the steel place in the test was 0.2 m.

In both tests the tensile strains on the convex sides of the test piece were well within the permissible elongations of the sheeting and no damage was observed.

The compressive strains on the concave side of the bent plate were calculated in this test to be of the order of 1% to 2% respectively, which is in excess of the permissible strain for hardened cement. This caused the matrix to fail by local loss of adhesion and slight crumbling but the sheeting still had sufficient integrity to provide protection.

I claim:
1. In a pipe length,
    an innermost cylindrical layer in the form of a steel pipe which defines the passage of the pipe length,
    a layer adjacent to and concentric with the steel pipe in the form of a helical winding of a cementitious material incorporating multiple, superposed, layers of network reinforcement of fibrillated organic film, said helically-wound layer being in a post-cracked condition and exhibiting multiple fine cracks in one surface when incorporated in the pipe length, and
    a cylindrical weight-coating of concrete bonded to, and surrounding the helically-wound layer, bonding to the helically-wound layer being enhanced by the penetration of components of the concrete into the said multiple fine cracks of the cementitious material of the said layer.
2. A pipe length according to claim 1 further comprising an outermost layer bonded to the cylindrical weight coating of concrete, wherein the innermost layer is comprised of helically wound cementitious sheeting containing multiple superposed layers of organic fibrillated film network in a postcracked condition with one surface exhibiting multiple fine cracks whereby bonding to the weight coating of concrete is facilitated.
3. A pipe length according to claim 1, comprising an anti-corrosion coating on the steel pipe and an adhesive layer between the anti-corrosion coating and the said helically wound layer.
4. A pipe length according to claim 1, wherein said helically wound layer is applied with a spacing between the turns thereby providing a continuous key along the pipe length for the bonding of the concrete layer.
5. In a coating for a pipe length
    an innermost layer formed by helically-wound cementitious sheeting with a reinforcement of multiple superposed layers of fibrillated organic film network,
    a further cylindrical layer of concrete surrounding the innermost layer,
    an outermost layer of helically-wound cementitious sheeting with a reinforcement of multiple superposed layers of fibrillated organic film network, the innermost and the outermost layers both being in a post-cracked condition and bonded to the concrete layer with multiple fine cracks directed towards the concrete layer whereby bonding between the layers and the concrete is strengthened by penetration of components of the concrete into the fine cracks.

* * * * *